US009616932B2

United States Patent
Nusier et al.

(10) Patent No.: US 9,616,932 B2
(45) Date of Patent: Apr. 11, 2017

(54) CHASSIS ASSEMBLY INCLUDING CONNECTOR BREAKING FEATURE

(71) Applicant: Ford Global Technologies, LLC, Dearborn, MI (US)

(72) Inventors: Saied Nusier, Canton, MI (US); Mohamed Ridha Baccouche, Ann Arbor, MI (US); Jamel E. Belwafa, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 214 days.

(21) Appl. No.: 14/712,275

(22) Filed: May 14, 2015

(65) Prior Publication Data
US 2016/0332670 A1    Nov. 17, 2016

(51) Int. Cl.
 *B62D 7/22*    (2006.01)
 *B62D 21/15*    (2006.01)
 *B62D 21/11*    (2006.01)
 *B62D 24/00*    (2006.01)
 *B62D 25/20*    (2006.01)

(52) U.S. Cl.
 CPC ............ *B62D 21/155* (2013.01); *B62D 21/11* (2013.01); *B62D 24/00* (2013.01); *B62D 25/2018* (2013.01)

(58) Field of Classification Search
 CPC ...... B62D 24/00; B62D 21/155; B62D 21/11; B62D 25/2018
 USPC .......................................... 280/784, 124.109
 See application file for complete search history.

(56) References Cited

U.S. PATENT DOCUMENTS

| | | | |
|---|---|---|---|
| 1,530,679 A | 3/1925 | Lambert | |
| 3,515,288 A | 6/1970 | Frill et al. | |
| 4,061,073 A | 12/1977 | Easter et al. | |
| 5,605,353 A | 2/1997 | Moss et al. | |
| 5,611,569 A * | 3/1997 | Sekiguchi | B62D 21/11 280/124.109 |
| 6,109,654 A | 8/2000 | Yamamoto et al. | |
| 6,739,624 B2 * | 5/2004 | Barber | B62D 21/11 280/124.109 |
| 7,654,543 B2 * | 2/2010 | Tanaka | B60G 7/02 180/312 |
| 8,579,309 B1 * | 11/2013 | Gagliano | B62D 21/11 180/312 |
| 8,585,066 B2 | 11/2013 | Young et al. | |

(Continued)

FOREIGN PATENT DOCUMENTS

| | | |
|---|---|---|
| EP | 2767457 | 8/2014 |
| KR | 20100042842 | 4/2010 |

*Primary Examiner* — Toan To
(74) *Attorney, Agent, or Firm* — Jason C. Rogers; Bejin Bieneman PLC

(57) ABSTRACT

A chassis assembly of a vehicle includes an underbody and a subframe. A connector extends along an axis and connects the subframe and the underbody. A first wedge is fixed to one of the underbody and the subframe about the axis and a second wedge is fixed to the other of the underbody and subframe about the axis. The first wedge includes a protrusion and the second wedge defines a recess receiving the protrusion in a direction along the axis. During a frontal impact of the vehicle, the subframe may rotate relative to the underbody. During this rotation the first wedge and second wedge rotate relative to each other and the protrusion moves along the recess to apply a tensile load to the connection to break the connection.

20 Claims, 6 Drawing Sheets

(56) References Cited

U.S. PATENT DOCUMENTS

| | | | |
|---|---|---|---|
| 8,620,529 B2 | 12/2013 | Faruque et al. | |
| 8,646,791 B2* | 2/2014 | Young | B62D 21/152 280/124.109 |
| 8,794,646 B1* | 8/2014 | Onishi | B62D 21/155 280/124.109 |
| 9,004,511 B1* | 4/2015 | Rosepiler | B60G 21/0551 280/124.109 |
| 9,010,849 B2* | 4/2015 | Komiya | B62D 21/11 280/124.109 |
| 2004/0046381 A1* | 3/2004 | Yoshida | B60G 99/00 280/784 |
| 2006/0181071 A1* | 8/2006 | Mitsui | B62D 21/155 280/784 |
| 2007/0024044 A1* | 2/2007 | Ogawa | B60G 3/20 280/788 |
| 2007/0169982 A1* | 7/2007 | Ogawa | B60G 3/20 180/312 |
| 2011/0198889 A1* | 8/2011 | Takeshita | B62D 21/155 296/203.02 |
| 2012/0286543 A1 | 11/2012 | Lee | |
| 2012/0313360 A1* | 12/2012 | Akaki | B62D 21/02 280/784 |
| 2013/0099460 A1* | 4/2013 | Tanaka | B60G 3/20 280/124.107 |
| 2014/0252739 A1* | 9/2014 | Otani | B62D 21/155 280/124.109 |
| 2015/0217808 A1* | 8/2015 | Haselhorst | B62D 21/11 280/124.109 |

* cited by examiner

CHASSIS ASSEMBLY INCLUDING CONNECTOR BREAKING FEATURE

BACKGROUND

A vehicle, such as an automobile, includes a frame and an underbody supported by the frame. The vehicle typically includes a subframe for supporting various components of an engine, drivetrain, and/or suspension of the vehicle. The subframe is typically mounted to the underbody of the vehicle with bolts, welding, etc. The subframe extends forwardly from the underbody toward a front bumper of the vehicle.

During impacts of a front of the vehicle, such as those defined by Federal Motor Vehicle Safety Standards (FMVSS) and Insurance Institute for Highway Safety (IIHS) standards including frontal impacts, angular frontal impact, small offset rigid barrier (SORB) impact, etc., front structural components of the vehicle may deform to absorb energy. In one type of configuration, the subframe of the vehicle is not designed to detach from the underbody. Such designs typically require additional energy absorbing features and restraint systems to properly handle energy during a frontal impact. For example, this type of subframe may transmit a larger pulse to the vehicle during a frontal impact, and this larger pulse may be addressed with the additional energy absorbing features and/or restraint systems.

In another type of configuration, the subframe is designed to detach from the underbody during frontal impact to lower the pulse and Vehicle Pulse Index during the frontal impact. Detachable subframes can be designed to shear the connection between the subframe and the underbody; however, this shearing can create design difficulties. There remains an opportunity to design a subframe that effectively detaches from the underbody during frontal impact.

DETAILED DESCRIPTION

Figure 1:
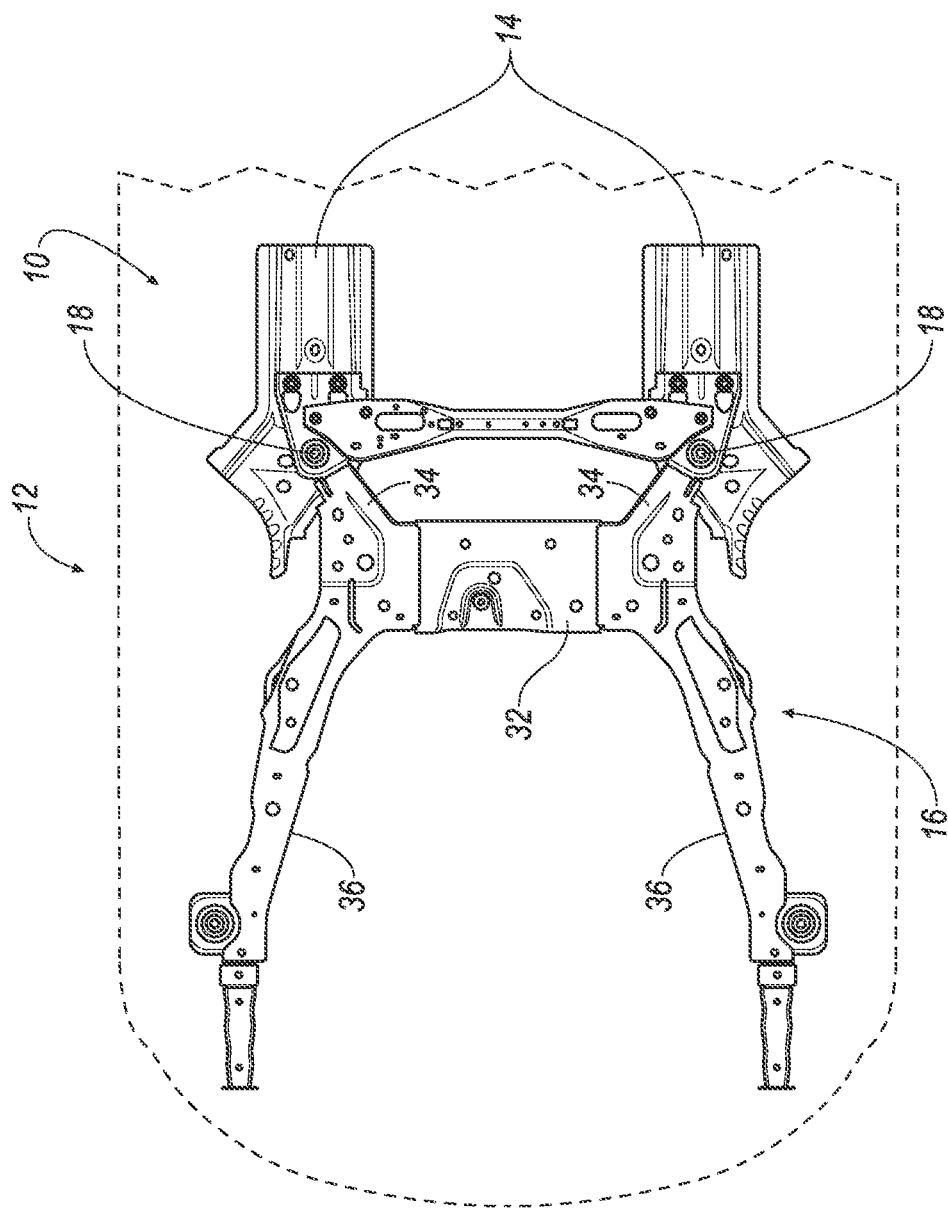
FIG. 1 is a bottom view of a portion of a vehicle including a chassis assembly having a frame, an underbody supported on the frame, and a subframe connected to the underbody.

With reference to the Figures, wherein like numerals indicate like parts throughout the several views, a chassis assembly 10 is generally shown. With reference to FIGS. 1-2B, the chassis assembly 10 includes an underbody 14 and a subframe 16. With reference to FIG. 3, a connector 18 extends along an axis A and connects the subframe 16 and the underbody 14. A first wedge 20 is fixed to one of the underbody 14 and the subframe 16 about the axis A and a second wedge 22 is fixed to the other of the underbody 14 and subframe 16 about the axis A. The first wedge 20 includes a protrusion 24 and the second wedge 22 defining a recess 26 receiving the protrusion 24 in a direction along the axis A. As one example, as set forth further below, the first wedge 20 includes a plurality of protrusions 24 and a plurality of recesses 28, and the second wedge 22 includes a plurality of protrusions 30 and a plurality of recesses 26. In such an embodiment, the recesses 28 of the first wedge 20 receive protrusions 30 of the second wedge 22, and the recesses 26 of the second wedge 22 receive the protrusions 24 of the first wedge 20.

Figure 2A:
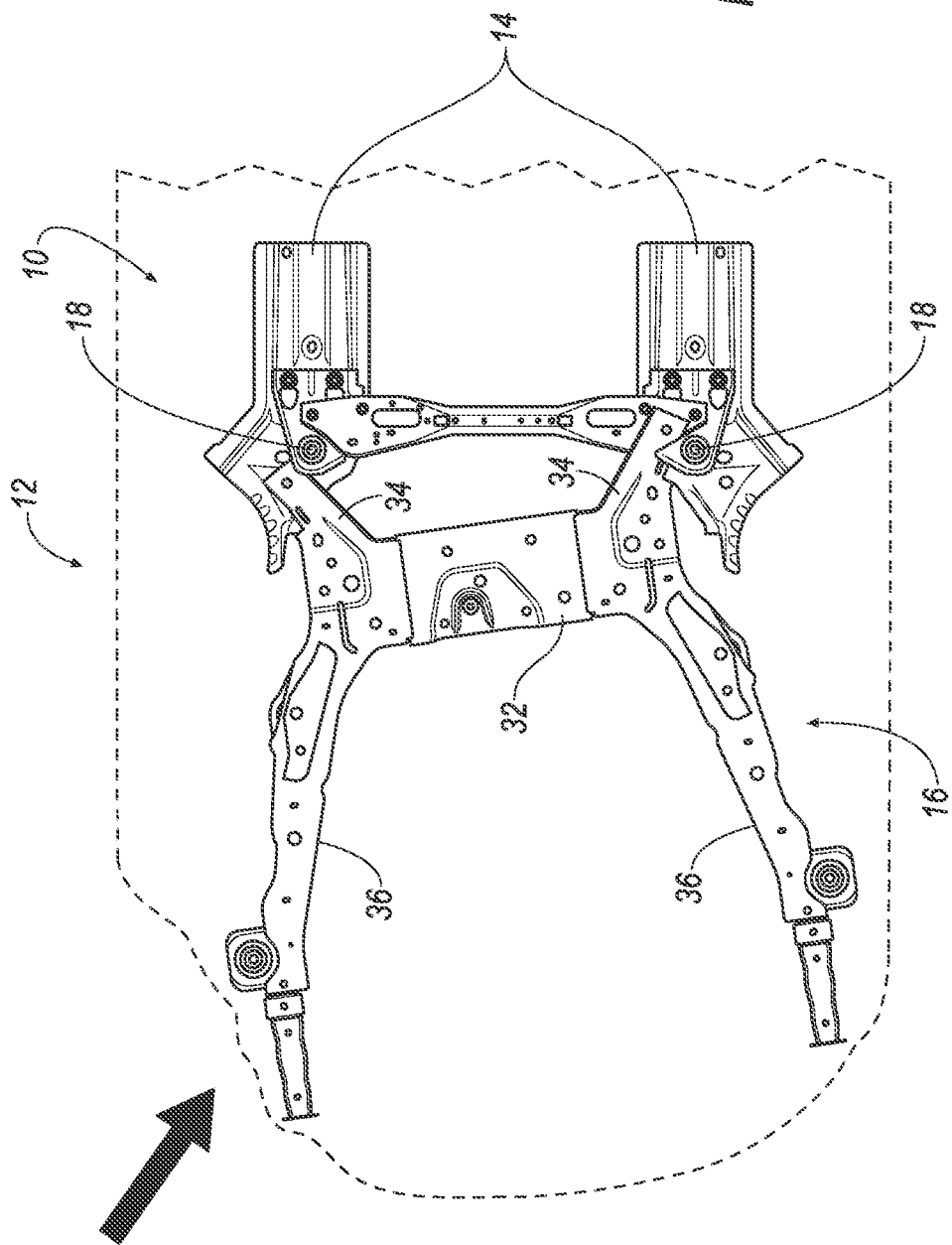
FIG. 2A is a bottom view of the vehicle of FIG. 1 during a frontal impact with one embodiment of the subframe rotating relative to the underbody.
Figure 2B:
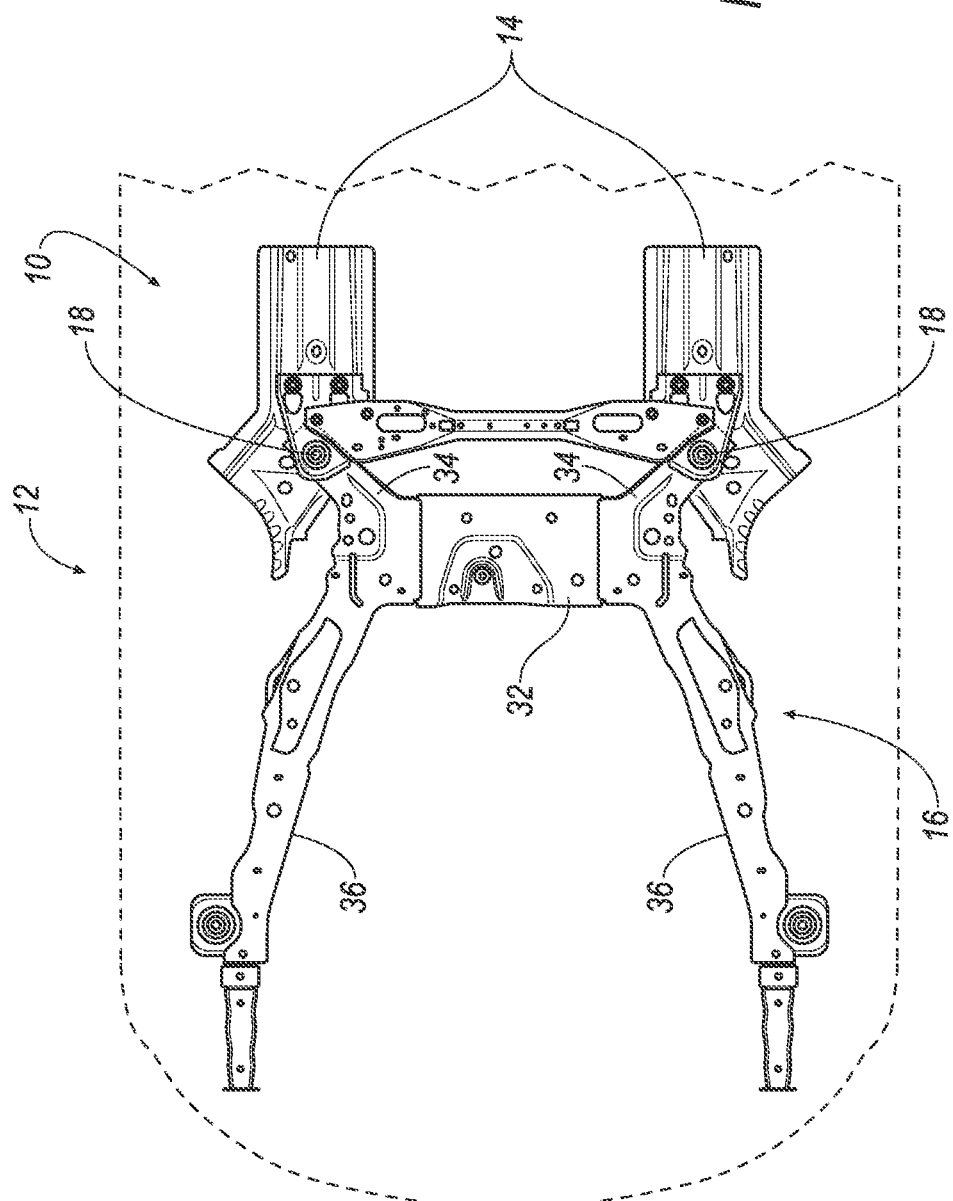
FIG. 2B is a bottom view of the vehicle of FIG. 1 during a frontal impact with another embodiment of the subframe rotating relative to the underbody.
Figure 3:
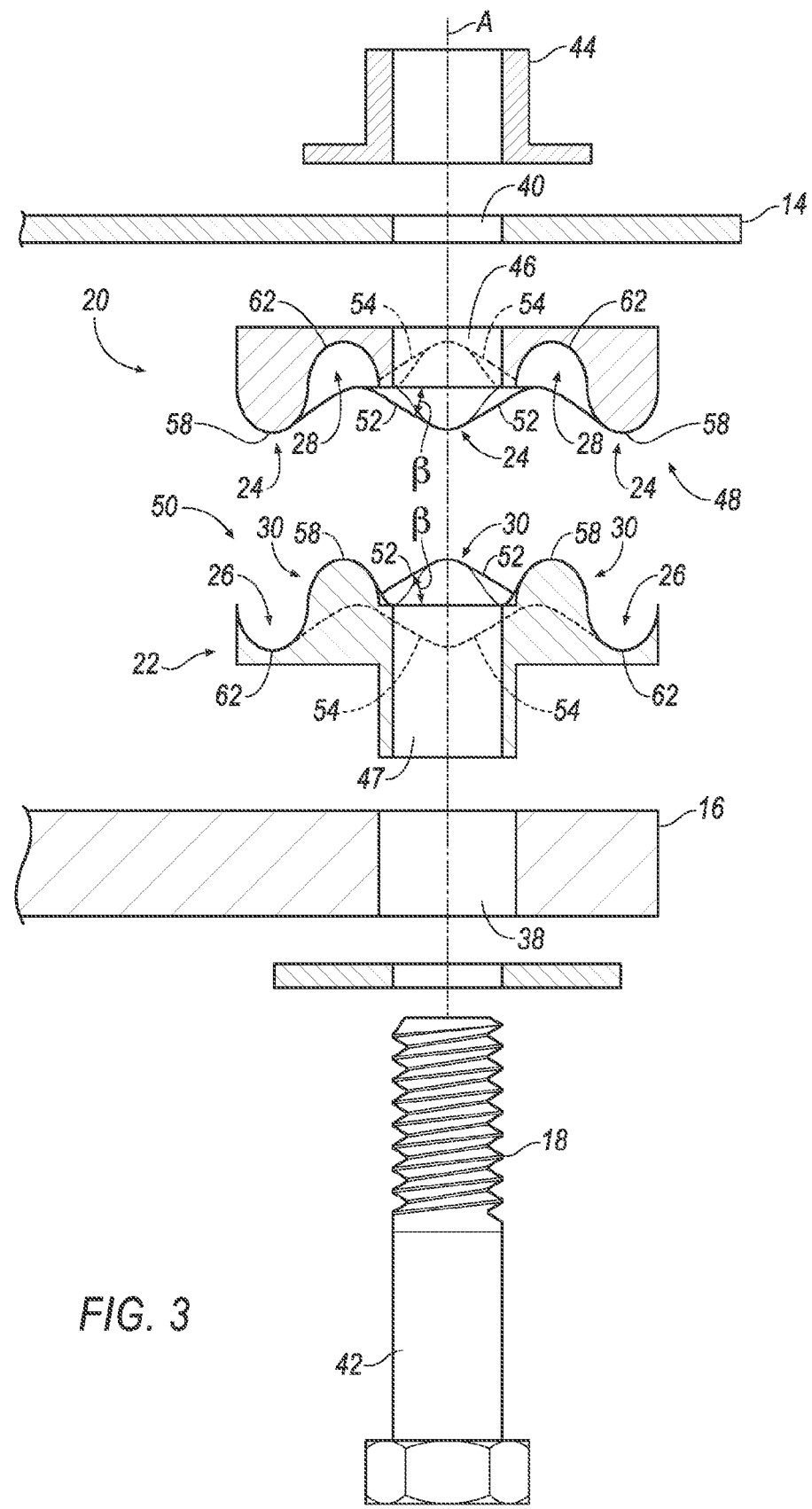
FIG. 3 is an exploded cross-sectional view of the underbody and the subframe along line 3 of FIG. 1 and showing a first wedge and a second wedge including nesting protrusions and recesses.
Figure 7:
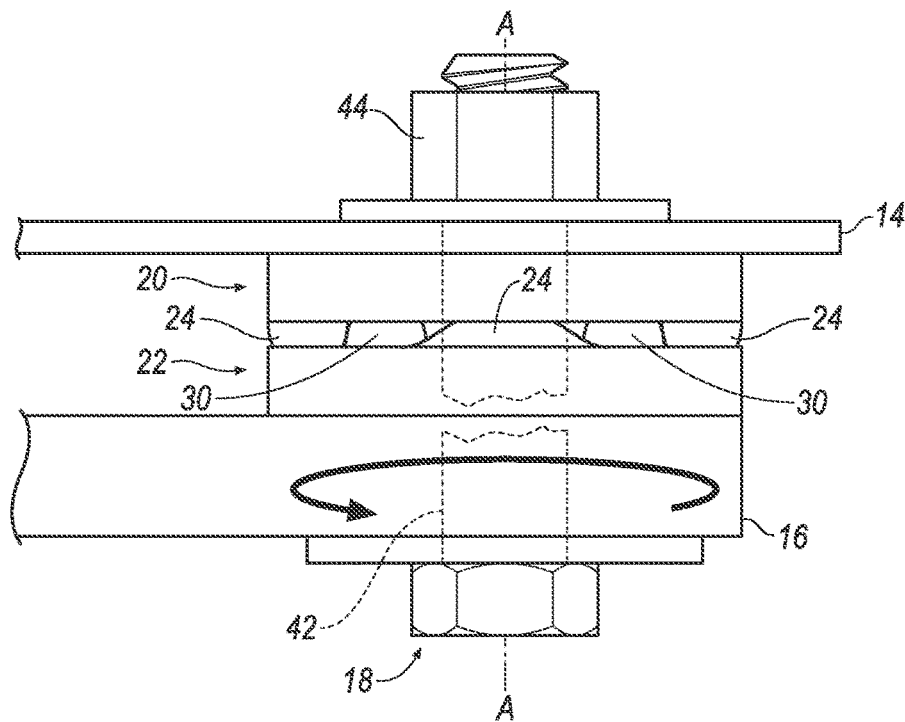
FIG. 7 is a side view of the underbody, the frame, the first wedge, and the second wedge during a frontal impact with the first wedge and the second wedge rotated relative to each other to move the underbody and the frame away from each other and breaking a bolt connecting the underbody and the frame.

As shown in FIGS. 2A and 2B, during a frontal impact of the vehicle 12, the subframe 16 may be forced in a rotational movement relative to the underbody 14. As the subframe 16 and underbody 14 rotate relative to each other, the protrusions 24, 30 ride along the recesses 26, 28 and forces the first wedge 20 and the second wedge 22 away from each other along the axis A and applies a tensile force on the connector 18. As shown in FIG. 7, as the first wedge 20 and the second wedge 22 move away from each other, the connector 18 breaks to allow the subframe 16 to separate from the underbody 14. The ultimate breakage of the connector 18 between the subframe 16 and the underbody 14 and the movement of the subframe 16 relative to the underbody 14 soften the pulse during the frontal impact and reduce the Vehicle 12 Pulse Index.

The vehicle 12 can be of any type. For example, the vehicle 12 can be an automobile, as shown in the Figures. Automobiles are subject to various standards including frontal impact standards as defined by Federal Motor Vehicle Safety Standards (FMVSS) and Insurance Institute for Highway Safety (IIHS) standards. The softened pulse and the reduction in the Vehicle 12 Pulse Index during the frontal impact resulting from the breakage of the connector 18 affect testing for these standards. The frontal impact may include, for example, head-on impact, angular frontal impact, small offset rigid barrier (SORB) impact, etc.

The underbody 14 may include a floor of the vehicle 12. The underbody 14 may be formed of sheet metal. The underbody 14 may be mounted to a frame (not shown) of the vehicle 12, e.g., mounted to rails of the frame.

The subframe 16 supports various components of an engine (not shown), drivetrain (not shown), and/or suspension (not shown) of the vehicle 12. The subframe 16 extends forwardly from the underbody 14 toward a front bumper (not numbered) of the vehicle 12. The subframe 16 can be formed, for example, of steel, aluminum, or any suitable material.

With continued reference to FIGS. 1-2B, the subframe 16 includes a base 32 and an arm 34 extending from the base 32. Specifically, the subframe 16 includes a pair of arms 34 spaced from each other and extending from the base 32 of the subframe 16. The subframe 16 may include additional arms 36 supporting the front bumper of the vehicle 12.

As set forth above, the connector 18 connects the subframe 16 and the underbody 14. Specifically, as shown in FIGS. 1-2B, two connectors 18 are spaced from each other and connect the subframe 16 and the underbody 14. Both of the connectors 18 may be identical.

With reference to FIG. 3, the subframe 16 defines a hole 38 for receiving the connector 18 and the underbody 14 defines a hole 40 for receiving the connector 18 to connect subframe 16 and the underbody 14. The connector 18 can be, for example, a bolt 42 that extends through the subframe 16 and the underbody 14 and a nut 44 threadedly engaging the bolt 42 to retain the connector 18 to the subframe 16 and the underbody 14. In such an embodiment, the bolt 42 extends along the axis A through the holes 38, 40 of the subframe 16 and the underbody 14. In such a configuration, the subframe 16 and the underbody 14 are locked between a head of the bolt 42 and the nut 44. Alternatively, the connector 18 may be, for example, a pin, a weld between the subframe 16 and the underbody 14, a rivet between the subframe 16 and the underbody 14, any type of fastener between the subframe 16 and the underbody 14, etc.

In one embodiment of the subframe 16, as shown in FIG. 2A, the subframe 16 may remain substantially undeformed at the underbody 14 during rotation during a frontal impact. Alternatively, as shown in FIG. 2B, the arms 34 of the subframe 16 may deform and rotate relative to the underbody 14 during the frontal impact.

The underbody 14 may be sheet metal, e.g., steel. The sheet metal of the underbody 14 may be 0.7-1.5 mm thick. Alternatively, the underbody 14 can be of any suitable material of any suitable thickness.

Figure 6:
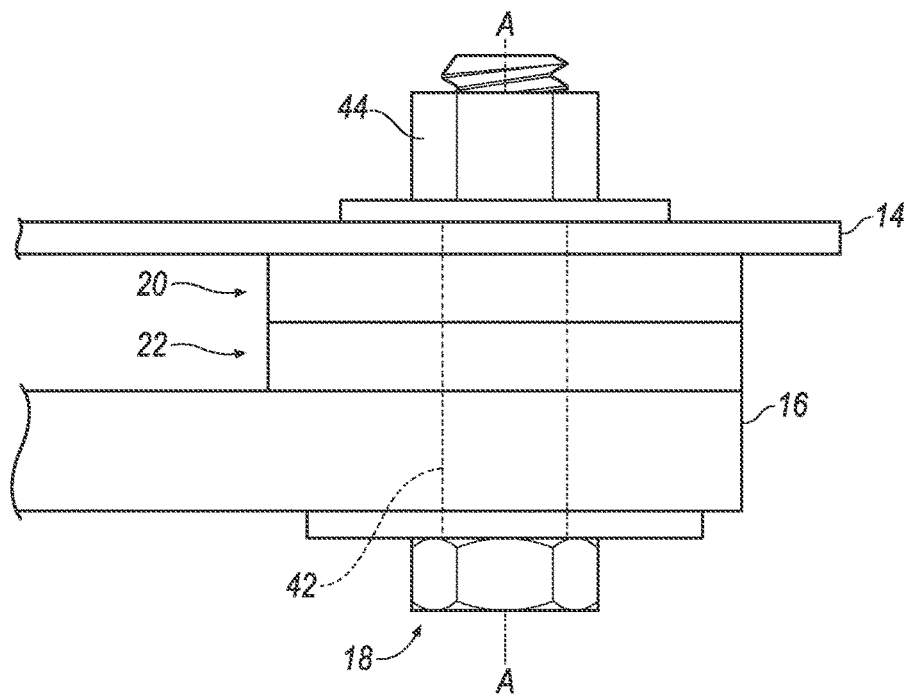
FIG. 6 is a side view of the underbody, the frame, the first wedge, and the second wedge in the position shown in FIG. 1.

As set forth above, the first wedge 20 is fixed to one of the subframe 16 and the underbody 14 and the second wedge 22 is fixed to the other of the subframe 16 and the underbody 14. For example, the FIGS. 6 and 7 show the first wedge 20 fixed to the underbody 14 and the second wedge 22 fixed to the subframe 16. In other words, the first wedge 20 is stationary relative to and moves with underbody 14 and the second wedge 22 is stationary relative to and moves with the subframe 16. The first wedge 20 and the second wedge 22 may be fixed to the underbody 14 and the subframe 16 in any suitable fashion, e.g., welding, adhering, fastening, etc. The first wedge 20 and the second wedge 22 may be formed separately from the underbody 14 and the subframe 16 and subsequently fixed to the underbody 14 and the subframe 16. Alternatively, the first wedge 20 and the second wedge 22 may be integrally formed with the underbody 14 and the subframe 16, i.e., formed together simultaneously as a single continuous unit. It should be appreciated that the words "first" and "second" are used herein merely as identifiers and do not denote importance, order, etc.

With reference to FIGS. 3-7, as set forth above, the first wedge 20 and the second wedge 22 extend about the axis A, i.e., extend at least partially around the axis A. As one example, as shown in the Figures, the first wedge 20 and the second wedge 22 may extend around the axis A, i.e., completely encircling the axis A. For example, the first wedge 20 may define a hole 46 receiving the connector 18 and the second wedge 22 may define a hole 47 receiving the connector 18. The axis A of the connector 18 extends through the holes and the first wedge 20 and the second wedge 22 extend around the holes, respectively, and the axis A.

Figure 4:
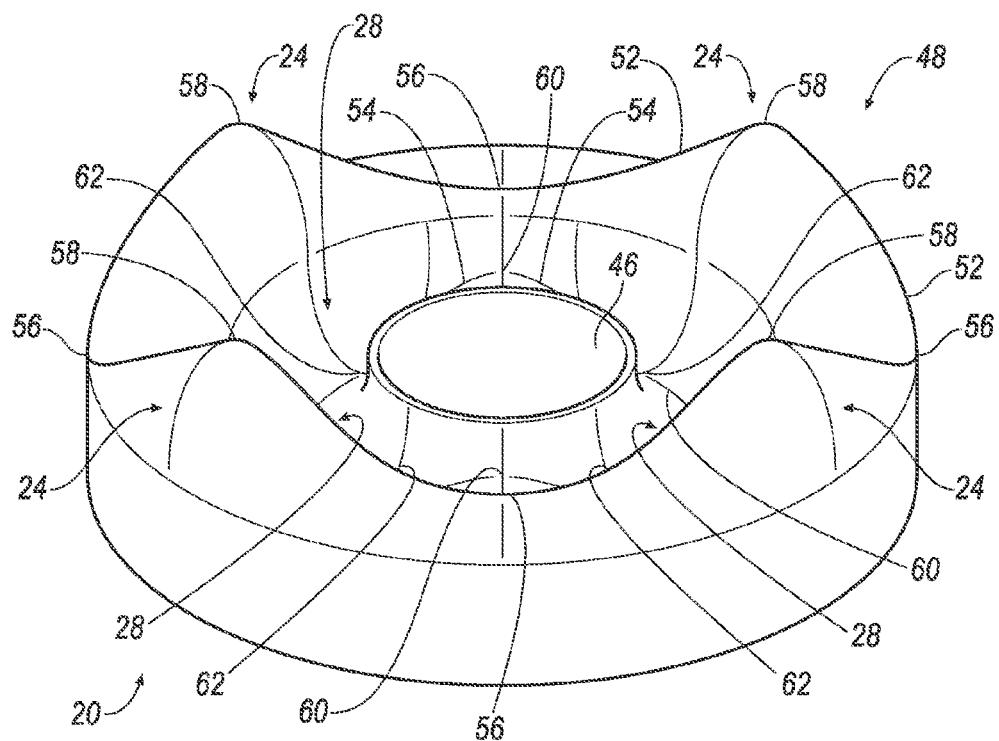
FIG. 4 is a perspective view of the second wedge.
Figure 5:
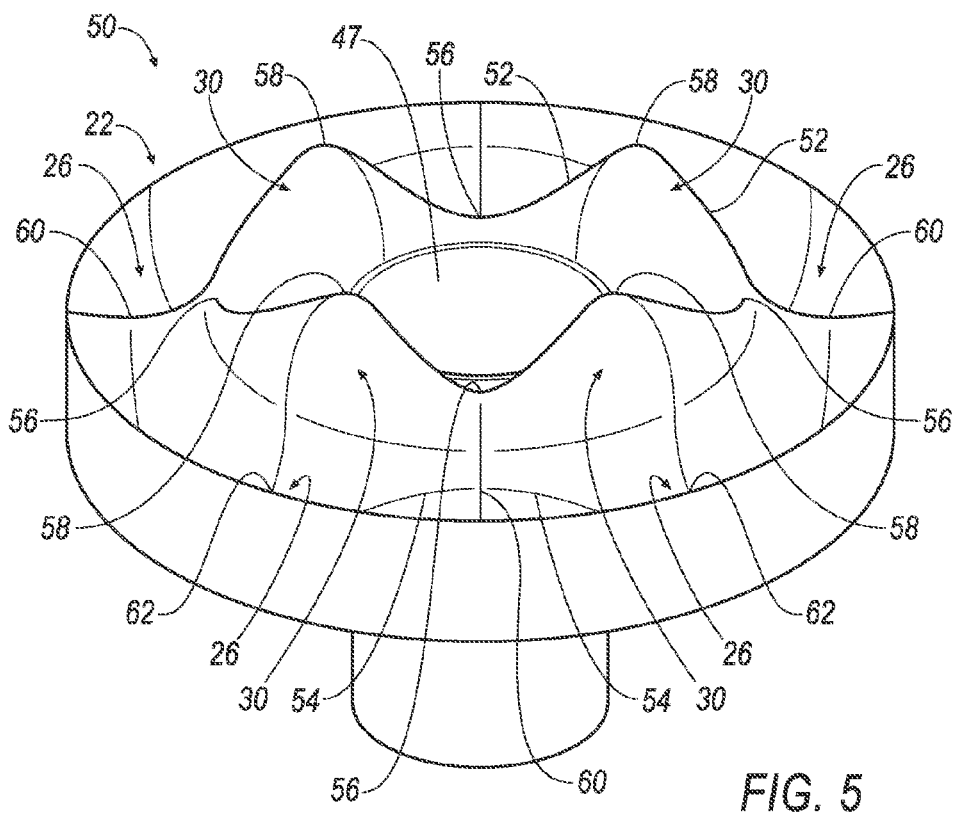
FIG. 5 is a perspective view of the first wedge.

With reference to FIGS. 3-5, as set forth above, the first wedge 20 may include a plurality of protrusions 24 and the second wedge 22 may define a plurality of recesses 26 each receiving one of the protrusions 24. As also set forth above, the first wedge 20 may define a plurality of recesses 28 and the second wedge 22 may define a plurality of protrusions 30 received in the recesses 28. Each recess 28 of the first wedge 20 may be aligned with one of the protrusions 30 of the second wedge 22 in a radial direction from the axis A. Similarly, each protrusion 24 of the first wedge 20 may be aligned with one of the recesses 26 of the second wedge 22. The protrusions 24 of the first wedge 20 may be positioned annularly about the axis A relative to each other and the recesses 28 of the first wedge 20 may be positioned annularly about the axis A relative to each other. The protrusions 24 may be positioned concentrically with the recesses 28. Similarly, the protrusions 30 of the second wedge 22 may be positioned annularly about the axis A relative to each other and the recesses 26 of the second wedge 22 may be positioned annularly about the axis A relative to each other The protrusions 30 may be positioned concentrically with the recesses 26.

With reference to FIGS. 3-7, the first wedge 20 includes a face 48 and the second wedge 22 includes a face 50. The faces 48, 50 may face each other, as shown in FIGS. 3 and 6-7. Each face 48, 50 may extend perpendicular to the axis A. The protrusions 24 and recesses 28 of the first wedge 20 may extend from the face 48 and the protrusion 30 and recesses 26 of the second wedge 22 may extend from the face 50. In particular, for example, the protrusions 24 and recesses 28 of the first wedge 20 may extend from the face 48 along the axis A, i.e., may extend in a parallel direction to the axis A. Similarly, the protrusions 30 and recesses 26 of the second wedge 22 may extend from the face 50 along the axis A, i.e., may extend in a parallel direction to the axis A.

Each protrusion 24, 30 may be configured to slide along the respective recess 26, 28 and move the underbody 14 and subframe 16 away from each other along the axis A in response to relative rotation between the underbody 14 and the subframe 16. For example, as set forth above with reference to FIGS. 1-2B, during a frontal impact of the vehicle 12, the subframe 16 may be urged to rotate relative to the underbody 14. As the subframe 16 rotates relative to the underbody 14, each protrusion 24, 30 rides in the respective recess 26, 28. As best shown in FIG. 7, during this rotation, each protrusion 24, 30 moves along the respective recess 26, 28 to push the first wedge 20 and the second wedge 22 away from each other and apply tension to the connector 18.

With reference to FIGS. 3-5, for each corresponding protrusion 24, 30 and recess 26, 28, at least one of the protrusion 24, 30 and the recess 26, 28 is ramped relative to the other, i.e., sloped at an acute angle. Specifically, the protrusions 24, 30 include a ramped surface 52 and the first wedge 20 and second wedge 22 each includes a ramped surface 54 in the recesses 26, 28 adjacent the ramped surface 52 of the protrusion 24, 30. For illustrative purposes, some of the ramped surfaces 52, 54 are identified in FIGS. 3-5.

At least a portion of each corresponding protrusion 24, 30 and recess 26, 28 may match in shape and size. For example, the ramped surfaces 52, 54 may have matching contours. In the embodiment shown in the Figures, for example, each corresponding protrusion 24, 30 and recess 26, 28 may match in shape and size along the entire protrusion 24, 30 and recess 26, 28.

The ramped surfaces 52, 54 of the protrusions 24, 30 and recesses 26, 28 may abut in the recess 26, 28 in the position shown in FIGS. 1 and 6. In any event, the ramped surfaces 52, 54 abut when the subframe 16 rotates relative to the underbody 14.

The ramped surface 52 of the protrusion 24, 30 extends at an acute approach angle B relative to the ramped surface of the corresponding recess, as identified in one instance in FIG. 3. This acute approach angle B encourages the ramped surfaces 52, 54 to slide relative to each other during relative rotation of the first wedge 20 and the second wedge 22.

The protrusions 24, 30 and the recesses 26, 28 may be curved, i.e., rounded, to encourage sliding of the ramped surfaces 52, 54 relative to each other. For example, as shown in FIGS. 4 and 5, the protrusions 24, 30 and the recesses 26, 28 curve along an annular direction about the axis A. In other words, each protrusion 24, 30 may extend from a base 56 to an apex 58 along the annular direction about the axis A, and each recess 26, 28 may extend from a base 60 to an apex 62 along the annular direction about the axis A, as identified in FIGS. 4 and 5. The protrusions 24, 30 and the recess 26, 28 may be curved along a radial direction from the axis A, as shown in FIGS. 4 and 5. The apexes 58, 62 may be rounded.

The connector 18, e.g., the bolt, is configured to break when the protrusions move the underbody 14 and the subframe 16 away from each other along the axis A, i.e., when the first wedge 20 and the second wedge 22 apply tensile forces to the connector 18 during relative rotation of the first wedge 20 and the second wedge 22. For example, the connector 18 may be formed of a selected material type, a selected thickness, and/or a selected shape designed to allow the connector 18 to break when the first wedge 20 and the second wedge 22 are urged to rotate relative to each other during a frontal impact.

In operation, as shown in FIG. 1, the subframe 16 is connected to the underbody 14 with the connector 18 extending along the axis A through the first wedge 20 and the second wedge 22. During operation of the vehicle 12 in the absence of a frontal impact, as shown in FIGS. 1 and 6, the first wedge 20 and the second wedge 22 are retained in position relative to each other by the connector 18 and prevent rotation of the subframe 16 relative to the underbody 14. During a frontal impact, as shown in FIGS. 2A, 2B, and 7, forces on the subframe 16 urge the subframe 16 to rotate relative to the underbody 14. If the force on the subframe 16 from the frontal impact exceeds a predetermined magnitude, the first wedge 20 and the second wedge 22 rotate relative to each other. During the relative rotation of the first wedge 20 and the second wedge 22, the protrusions 24, 30 ride along the recesses 26, 28 to move the first wedge 20 and the second wedge 22 away from each other. This movement of the first wedge 20 and the second wedge 22 away from each other applies tension to the connector 18 and the connector 18 breaks. Once the connector 18 breaks, the subframe 16 is free to move further relative to the underbody 14, which softens the pulse during the frontal impact and reduces the Vehicle Pulse Index.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A chassis assembly comprising:
an underbody;
a subframe;
a connector extending along an axis and connecting the subframe and the underbody;
a first wedge fixed to one of the underbody and the subframe about the axis; and
a second wedge fixed to the other of the underbody and subframe about the axis;
the first wedge including a protrusion and the second wedge defining a recess receiving the protrusion in a direction along the axis.

2. The chassis assembly as set forth in claim 1 wherein at least one of the protrusion and the recess is ramped relative to the other.

3. The chassis assembly as set forth in claim 1 wherein the protrusion is configured to slide along the recess and move the underbody and subframe away from each other along the axis in response to relative rotation between the underbody and the subframe.

4. The chassis assembly as set forth in claim 3 wherein the connector is configured to break when the protrusion moves the underbody and the subframe away from each other along the axis.

5. The chassis assembly as set forth in claim 1 wherein the protrusion includes a ramped surface and the second wedge includes a ramped surface in the recess adjacent the ramped surface of the protrusion.

6. The chassis assembly as set forth in claim 5 wherein the ramped surfaces have matching contours.

7. The chassis assembly as set forth in claim 5 wherein the ramped surfaces abut in the recess.

8. The chassis assembly as set forth in claim 5 wherein the ramped surface of the protrusion extends at an acute approach angle.

9. The chassis assembly as set forth in claim 1 wherein the protrusion and the recess curve along an annular direction about the axis.

10. The chassis assembly as set forth in claim 1 wherein the protrusion and the recess are curved along a radial direction from the axis.

11. The chassis assembly as set forth in claim 1 wherein the protrusion is further defined as a plurality of protrusions and the wherein the recess is further defined as a plurality of recesses each receiving one of the protrusions.

12. The chassis assembly as set forth in claim 11 wherein the protrusions are positioned annularly about the axis.

13. The chassis assembly as set forth in claim 11 wherein the first wedge defines a plurality of recesses positioned relative to each protrusion in a radial direction from the axis and wherein the second wedge defines a plurality of protrusions received in the recesses of the first wedge.

14. The chassis assembly as set forth in claim 13 wherein each of the recesses of the first wedge are aligned with one of the protrusions of the first wedge in a radial direction from the axis.

15. The chassis assembly as set forth in claim 1 wherein the first wedge defines a recess positioned relative to the protrusion in a radial direction from the axis.

16. The chassis assembly as set forth in claim 15 wherein the second wedge defines a protrusion received in the recess of the first wedge.

17. The chassis assembly as set forth in claim 1 wherein the first wedge and the second wedge each define a hole receiving the connector.

18. The chassis assembly as set forth in claim 1 wherein the first wedge and the second wedge extend around the axis.

19. The chassis assembly as set forth in claim 1 wherein the connector is a bolt.

20. The chassis assembly as set forth in claim 1 wherein the first wedge and the second wedge each include a face facing each other and extending perpendicular to the axis, the protrusion extending from the face of the first wedge and the recess defined in the face of the second wedge.

* * * * *

UNITED STATES PATENT AND TRADEMARK OFFICE
CERTIFICATE OF CORRECTION

PATENT NO. : 9,616,932 B2  
APPLICATION NO. : 14/712275  
DATED : April 11, 2017  
INVENTOR(S) : Saied Nusier et al.

Page 1 of 1

It is certified that error appears in the above-identified patent and that said Letters Patent is hereby corrected as shown below:

In the Claims

Column 6, Line 34, Claim 11:  
Before --wherein-- delete "the".

Signed and Sealed this  
Twenty-third Day of May, 2017

Michelle K. Lee  
*Director of the United States Patent and Trademark Office*